US011663015B2

(12) United States Patent
Tuteja et al.

(10) Patent No.: US 11,663,015 B2
(45) Date of Patent: May 30, 2023

(54) TRACKING ASYNCHRONOUS EVENT PROCESSING

(71) Applicant: International Business Machines Corporation, Armonk, NY (US)

(72) Inventors: Mukul Tuteja, San Ramon, CA (US); Deanna Lynn Quigg Brown, Queen Creek, AZ (US); Yaxiong Liu, Foster City, CA (US); Yash Bopardikar, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 16/936,501

(22) Filed: Jul. 23, 2020

(65) Prior Publication Data

US 2022/0027163 A1   Jan. 27, 2022

(51) Int. Cl.
   *G06F 9/54* (2006.01)
   *G06F 9/38* (2018.01)
   *G06F 9/50* (2006.01)

(52) U.S. Cl.
   CPC .......... *G06F 9/3871* (2013.01); *G06F 9/5072* (2013.01); *G06F 9/5077* (2013.01); *G06F 9/542* (2013.01); *G06F 9/546* (2013.01)

(58) Field of Classification Search
   None
   See application file for complete search history.

(56) References Cited

U.S. PATENT DOCUMENTS

| | | | | |
|---|---|---|---|---|
| 10,242,073 B2 * | 3/2019 | Koerner | ............. | G06F 16/2471 |
| 10,341,354 B2 * | 7/2019 | Murugesan | ........... | G06F 3/0482 |
| 10,348,858 B2 * | 7/2019 | Theebaprakasam | ........................ | G06F 21/6218 |
| 10,382,300 B2 * | 8/2019 | Ellenbogen | ............ | G06N 20/00 |
| 10,909,054 B2 * | 2/2021 | Subbanna | ........... | G06F 13/1668 |
| 10,979,521 B2 * | 4/2021 | Walsh | .................... | H04L 67/141 |
| 2003/0046396 A1 * | 3/2003 | Richter | .................... | G06F 9/505 709/226 |
| 2006/0240818 A1 | 10/2006 | McCoy et al. | | |
| 2018/0248771 A1 | 8/2018 | Cote et al. | | |
| 2018/0307514 A1 | 10/2018 | Koutyrine et al. | | |

FOREIGN PATENT DOCUMENTS

| | | |
|---|---|---|
| CN | 108965442 A | 12/2018 |
| CN | 109978503 A | 7/2019 |
| CN | 110300056 A | 10/2019 |

(Continued)

OTHER PUBLICATIONS

"Quickstart: Route custom events to Azure Event Hubs with Azure CLI and Event Grid", Microsoft Azure, Nov. 4, 2019, 6 pages. https://docs.microsoft.com/en-us/azure/event-grid/custom-event-to-eventhub.

(Continued)

*Primary Examiner* — Michael Sun (74) *Attorney, Agent, or Firm* — Peter J. Edwards (57) ABSTRACT

A messaging system receives a registration from a first microservice for one or more event types to publish, and the registration includes an event report policy. The messaging system receives a first event, and the first event is described by the event report policy. The first event is monitored as it is processed by a second microservice. An event report describing the results of the monitoring is delivered to the first microservice.

20 Claims, 7 Drawing Sheets

(56) References Cited

FOREIGN PATENT DOCUMENTS

| | | |
|---|---|---|
| CN | 107766205 B | 11/2019 |
| JP | 5160134 B2 | 3/2013 |
| WO | 2009065049 A1 | 5/2009 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

TRACKING ASYNCHRONOUS EVENT PROCESSING

BACKGROUND

The present disclosure relates generally to the field of microservice architecture, and more particularly to tracking asynchronous event processing in microservices architectures.

Cloud computing environments frequently include some type of microservices architecture for business-related and other applications. Multiple microservices may run in a single environment as distributed processes. These microservices may be disjointed and/or loosely coupled. In such a configuration, asynchronous inter-process communications may be employed to allow the microservices to communicate.

SUMMARY

Embodiments of the present disclosure include a method, computer program product, and system for tracking asynchronous event processing in a microservice architecture using a messaging system to publish events.

A messaging system receives a registration from a first microservice for one or more event types to publish, and the registration includes an event report policy. The messaging system receives a first event, and the first event is described by the event report policy. The first event is monitored as it is processed by a second microservice. An event report describing the results of the monitoring is delivered to the first microservice.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of microservice architecture, and more particularly to tracking asynchronous event processing in microservices architectures. While the present disclosure is not necessarily limited to such applications, various aspects of the disclosure may be appreciated through a discussion of various examples using this context.

With the rise and spread of cloud computing to facilitate business and other needs, microservices architectures have become increasingly complex. Even so, it is often highly desirable to maintain a degree of separation among various microservices, which may eliminate bottlenecks and improve efficiency of the entire cloud computing environment. However, inter-process communication among related microservices must be maintained.

For example, when an enterprise interacts with an application (e.g., makes some kind of change), the request may be delegated to the particular microservice that handles that kind of request. The microservice then executes the requested change. However, this change (e.g., price change to a particular item sold by the enterprise) may impact other microservices (e.g., billing microservice) that consequently will also need to change to accommodate the adjusted microservice.

To ensure the downstream effects of a change are accounted for, the micro service receiving the original change request can "publish" the change to a "messaging system" as an event. Other microservices can "subscribe" to the event. In this way, the microservices may communicate asynchronously and maintain a loosely coupled relationship. Such an asynchronous, event-driven architecture is fundamental to the design of microservices architectures, because any hard dependencies (e.g., synchronous communication) between microservices could potentially result in cascading failures, reduce the uptime of critical service, and consequently lead to potential loss of revenue and customer base.

Such publish/subscribe schemes facilitate "fire and forget" scenarios where a publishing microservice does not need to be aware of whether any subscribing microservices have successfully processed the event. However, in certain situations, the publisher may need or want to know whether the event has been received and/or processed by any subscribers. Embodiments of the present disclosure demonstrate a method and architecture which may, for example, enable a messaging system to asynchronously track and report (e.g., back to a publisher or other microservice) the status of an event as it is processed by the relevant subscribing microservices.

As an example, when a user cancels an IBM CLOUD account, an account management service receives the cancellation request, and emits an account status change notification. Other core platform services, such as IBM CLOUD's resource provisioning engine, user management service, cloud identity and access management service, cloud foundry service, infrastructure service, etc., subscribe to such events and will change and "clean up" their individual resources for the cancelled account. In such a situation, the account management service (e.g., the publisher) needs to know that all the downstream/subscribing services have completed their changes before it can close the account and revoke the user's access.

As another example, a user may wish to change their cloud platform login identity provider (e.g., from SOFTLAYER to IBMID). The account management service receives the change request, publishes the change (e.g., as an event at the messaging service), and marks the request as "pending." The event (e.g., the identity provider change) is received and processed by multiple downstream/subscribing microservices. The publisher (e.g., the account management service) needs to know the status of the subscribing microservices so that it can mark the user's request as completed/successful and enable the user(s) to login with the new cloud platform login identity provider.

In other situations, a first subscriber to an event may also want to know the processing status of other subscribers. Current messaging systems for asynchronous, event-based communication among microservices fail to provide native capabilities for inter-subscriber communications.

To facilitate more robust tracking of event processing in asynchronous microservices architecture(s), embodiments of the present disclosure provide for a framework to extend the capabilities of traditional messaging systems (e.g., APACHE KAFKA) by generating event delivery and status reports for all subscribers to a given event. These reports can be generated for individual events or batch events, and/or for events within a specified timeframe.

In embodiments, a publisher can subscribe to such reports, and the extended framework may ensure delivery of the reports back to the publisher. In this way, the publisher will be made aware of the status of all the subscribers to the event.

In embodiments, the extended framework messaging system may support various types of subscriber reports covering different classes of events (e.g., acknowledgment reports, change processing status reports, and/or quality of service reports).

In embodiments, an acknowledgement report may contain information regarding the initial delivery status of an event to the subscribers. In other words, this is an initial acknowledgement, from a given subscriber or group of subscribers, acknowledging that they have received the information about the change from the publisher.

In embodiments, a change processing status report may contain a status from each subscriber after they have applied the intended change from the publisher within their respective microservice. Examples of a status may include an indication of success, failure, or pending. A pending status may indicate an estimation of the time to completion and/or when to expect a final status.

In embodiments, quality of service reports may contain metrics for the extended framework messaging system to allow publishers and/or subscribers to understand latency, throughput, subscriber response times, subscriber processing times, success rates, etc.

Embodiments of the present disclosure allow publishers to onboard to the extended framework messaging system and allow them to register event types/classes, which will be emitted at runtime. In this way, it may be ensured that only authorized publishers can publish events for which they have rights/privileges.

In embodiments, when registering an event type/class with the extended framework messaging system, the publisher may also attach a "policy configuration," or an event policy, with each event type/class. According to embodiments, this may allow publishers to configure, for example, the type of subscriber delivery reports to receive, a list of subscribers from which to receive change processing status reports, timeout parameters, and webhook parameters. Timeout parameters may include, for example, criteria for aborting the collection of various reports and/or generating a partial change status report. Webhook parameters may include, for example, criteria regarding where and how the delivery and other reports will be delivered by the extended framework messaging system.

In embodiments, the extended framework messaging system may automatically enable retries when one of the subscribers fails to process an event. Further, publishers may consume change processing status reports with processing details/metrics from each subscriber and generate a rollback event if one or more subscribers has permanently failed to process the change. The extended framework messaging system may automatically ensure the guaranteed delivery of the rollback event to the subscribers which originally received the event. In some embodiments, this may be performed using parallel processing techniques, such as Single Instruction Multiple Data (SIMD), to ensure concurrent processing of the rollback event by the subscribers.

Figure 1:
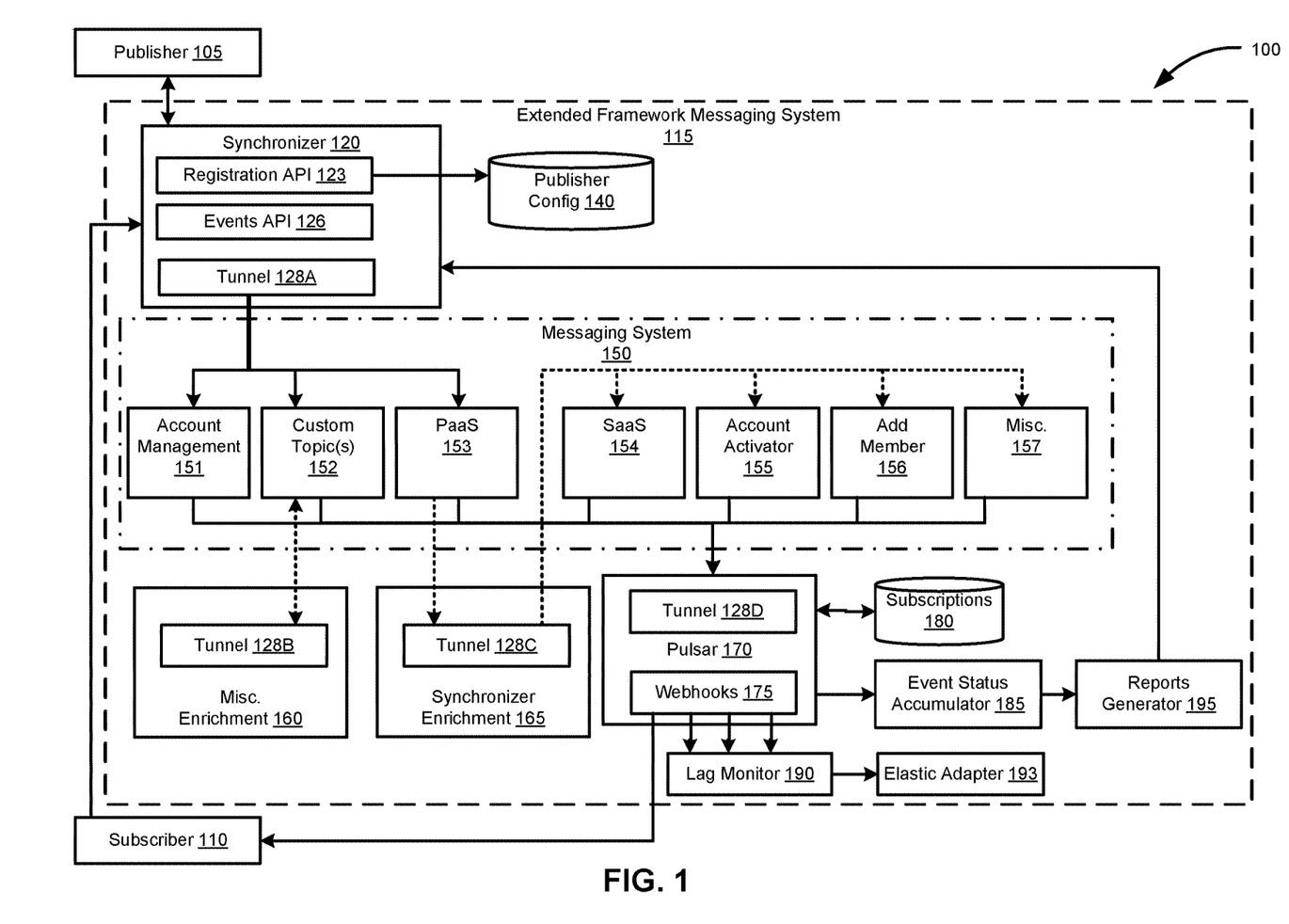
FIG. 1 illustrates an example computing environment, in accordance with embodiments of the present disclosure.

Referring now to FIG. 1, illustrated is an example computing environment 100, in accordance with embodiments of the present disclosure. In some embodiments, example computing environment 100 may include a publisher 105, a subscriber 110, and an extended framework messaging system 115.

In embodiments, publisher 105 may be, as described herein, a microservice that is receiving one or more requests from a client device or user, and which publishes an event to extended framework messaging system 115. A subscriber 110 may be, as described herein, a microservice receiving a published event from extended framework messaging system 115, and which may generate/send receipt reports, change process status reports, and/or metrics.

Extended framework messaging system 115 may, in embodiments, include a messaging system built on top of a messaging system 150. Extended framework messaging system 115 may enable messaging system 150 to utilize additional capabilities, such as the generation, delivery, and monitoring of event processing reports. Extended framework messaging system 115 may include synchronizer 120, which enables publisher 105 to onboard and register for event reports. As described herein, publisher 105 may configure, for example, the type of subscriber delivery reports to receive, a list of subscribers from which to receive change processing status reports, timeout parameters, and webhook parameters. This configuration may be stored in publisher config 140.

Synchronizer 120 may include, for example, registration API 123, events API 126, and tunnel 128A. In embodiments, registration API 123 may be an Application Programming Interface (API) to facilitate the onboarding/registration of a configuration for publisher 105. Events API 126 may include an API to facilitate a subsequent event report request from an already-registered publisher 105. Tunnel 128A-D may, in embodiments, include communication protocols for encrypted and secure communications among the various components of extended framework messaging system 115. For example, Tunnel 128A-D may include Point to Point Tunneling Protocol (PPTP), Layer 2 Tunneling Protocol (L2TP), Internet Protocol Security (IPSec), Secure Socket Tunneling Protocol (SSTP), OpenVPN, Secure Shell (SHH), etc. In other embodiments, Tunnel 128A-D may be unencrypted.

Once publisher 105 is onboarded, or has subsequently requested event reports, registration API 123 and/or events API 126 may store the policy configuration for the event reports request in publisher config 140 and may communicate with messaging system 150 and other components via tunnel 128A.

In embodiments, a sample of code for a policy configuration may include:

```
Policy configuration document (sample)
{
    publisher_id: "account-management",
    publisher_crn:
    event_type: "account.canceled",
    event_family:
    webhook:
    subscriber_reports: [{
        report_id:
        report_type: "ACKNOWLEDGEMENT | CHANGE_STATUS
        | ",
        report_timeout:
        report_topic:
        batch_enabled:
        batch_size:
    }]
    coordinate-rollback: true
}
```

Messaging system 150 may be similar to a more traditional messaging system, such as the messaging systems used by APACHE KAFKA, MICROSOFT AZURE, etc. Messaging system 150 may include microservices for account management 151, custom topic(s) 152, PaaS 153, SaaS 154, account activator 155, add member 156, and misc. 157.

In embodiments, account management 151 may include, for example, a microservice dedicated to updating information related to pre-existing accounts. For example, when a user changes a password. In embodiments, custom topic(s) 152 may include a variety of microservices tailored for a specific purpose. In embodiments, PaaS 153 may include microservices to facilitate the provisioning of Platform as a Service (PaaS), as described below (e.g., CLOUD FOUNDRY).

In embodiments, SaaS 154 may include microservices to facilitate the provisioning of Software as a Service (SaaS), as described below. In embodiments, account activator 155 may include microservices for activating/deactivating a user account on a pre-existing microservice.

In embodiments, add member 156 may include microservices related to the addition or deletion of a user from a particular account. In some embodiments, misc. 157 may include other microservices not expressly discussed in this disclosure.

In some embodiments, the information processed by various microservices in the messaging system 150 may be enriched with internal and/or external sources. For example, misc. enrichment 160 may provide data enrichment for custom topic(s) 152, using tunnel 128B.

In embodiments, synchronizer enrichment 165 may provide data enrichment for data related to the event(s) for which publisher 105 wishes to receive event reports. Synchronizer enrichment 165 may communicate with other components using tunnel 128C. Synchronizer enrichment 165 may enable a variety of enrichment methods, such as external lookups (e.g., retrieving information from a database external to the extended framework messaging system 115), application caches (e.g., caching information from an internal source, such as publisher config 140 or subscriptions 180), and data capture (e.g., monitoring data streams as they are processed by the messaging system 150). In some embodiments, synchronizer enrichment 165 may enrich data on the fly as it travels through the pipeline of messaging system 150 and pass the enriched data to downstream microservices.

In embodiments, pulsar 170 may include an interface for subscribers, such as subscriber 110. Subscriber 110 may utilize pulsar 170 to register for desired event types, along with webhook endpoints (e.g., webhooks 175) which will receive the events. In embodiments, subscriber 110, may have its subscriptions stored in a repository, such as subscriptions 180. Pulsar 170 may track events as they are delivered to subscriber 110 or other subscribers (not pictured). Pulsar 170 may communicate with various components using tunnel 128D. In this way, pulsar 170 may collect the data required to generate acknowledgement reports without any additional involvement from subscriber 110. In embodiments, pulsar 170 may also initialize a change status report for change status events.

In embodiments, event status accumulator 185 may receive acknowledgement and/or initialized change status reports from pulsar 170. Event status accumulator 185 may, in embodiments, receive processing status events from subscriber 110 to update a change status report. Event status accumulator 185 may automatically pass acknowledgement reports to reports generator 195, or, in some embodiments, pulsar 170 may pass acknowledgement reports to reports generator 195, directly.

In embodiments where event status accumulator 185 receives updates from subscriber 110, the receipt of those updates (or the receipt of updates from multiple subscribers, in embodiments) may trigger event status accumulator 185 to deliver the information to reports generator 195 so that it may finalize the report and deliver it back to synchronizer 120. In this way, synchronizer 120 may receive acknowledgement and change status reports and notify publisher 105 of the acknowledgement and/or change in status for a given event.

In some embodiments, subscriber 110 may pass data regarding the processing of an event directly back to synchronizer 120, bypassing event status accumulator 185 and reports generator 195.

In some embodiments, a publisher 105 and/or subscriber 110 may desire a metrics report for one or more components of the extended framework messaging system 115. In such embodiments, lag monitor 190 may collect metrics data from messaging system 150 and/or pulsar 170 via webhooks 175. In embodiments, lag monitor 190 may, in an elastic search instance, temporarily store offset metrics using elastic adapter 193.

Figure 2:
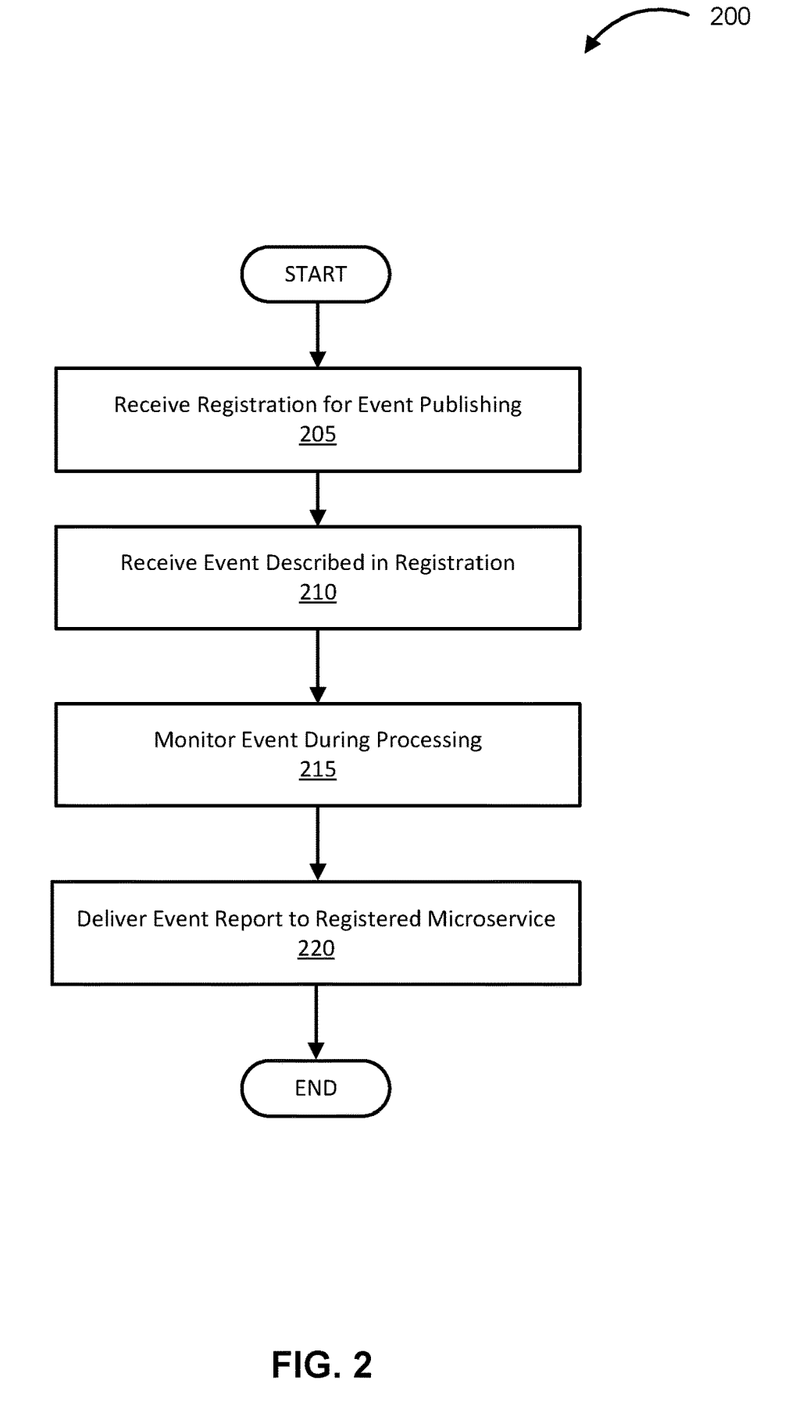
FIG. 2 illustrates a flowchart of a method for tracking asynchronous event processing, in accordance with embodiments of the present disclosure.

Referring now to FIG. 2, illustrated is a flowchart of a method 200 for tracking asynchronous event processing, in accordance with embodiments of the present disclosure. Method 200 may begin at 205, where a registration for event publishing is received from a publisher (e.g., a first microservice). As described herein, registration for the publishing of events may be facilitated using APIs at, for example, synchronizer 120 of FIG. 1. In embodiments, the registration may include an event policy describing the type of report desired (e.g., acknowledgment, change processing status, quality of service, etc.) The event policy may further include webhook configurations, a list of subscribers (e.g., downstream microservices, a second microservice, etc.), timeout configurations, etc.

At 210, a first event described by the event policy is received. In embodiments, the received event may include a change to a microservice configuration, the delivery of data, or any other event to which a subscriber has subscribed, or for which a publisher desires an event report.

At 215, the event is monitored as it is processed by the relevant microservice. The relevant microservice may be a downstream microservice targeted by the particular event, as described herein.

At 220, an event report is delivered to the registered microservice (e.g., the first microservice). In embodiments, the event report may describe the results of the monitoring (e.g., acknowledgment, change processing status, metrics, etc.)

Figure 3A:
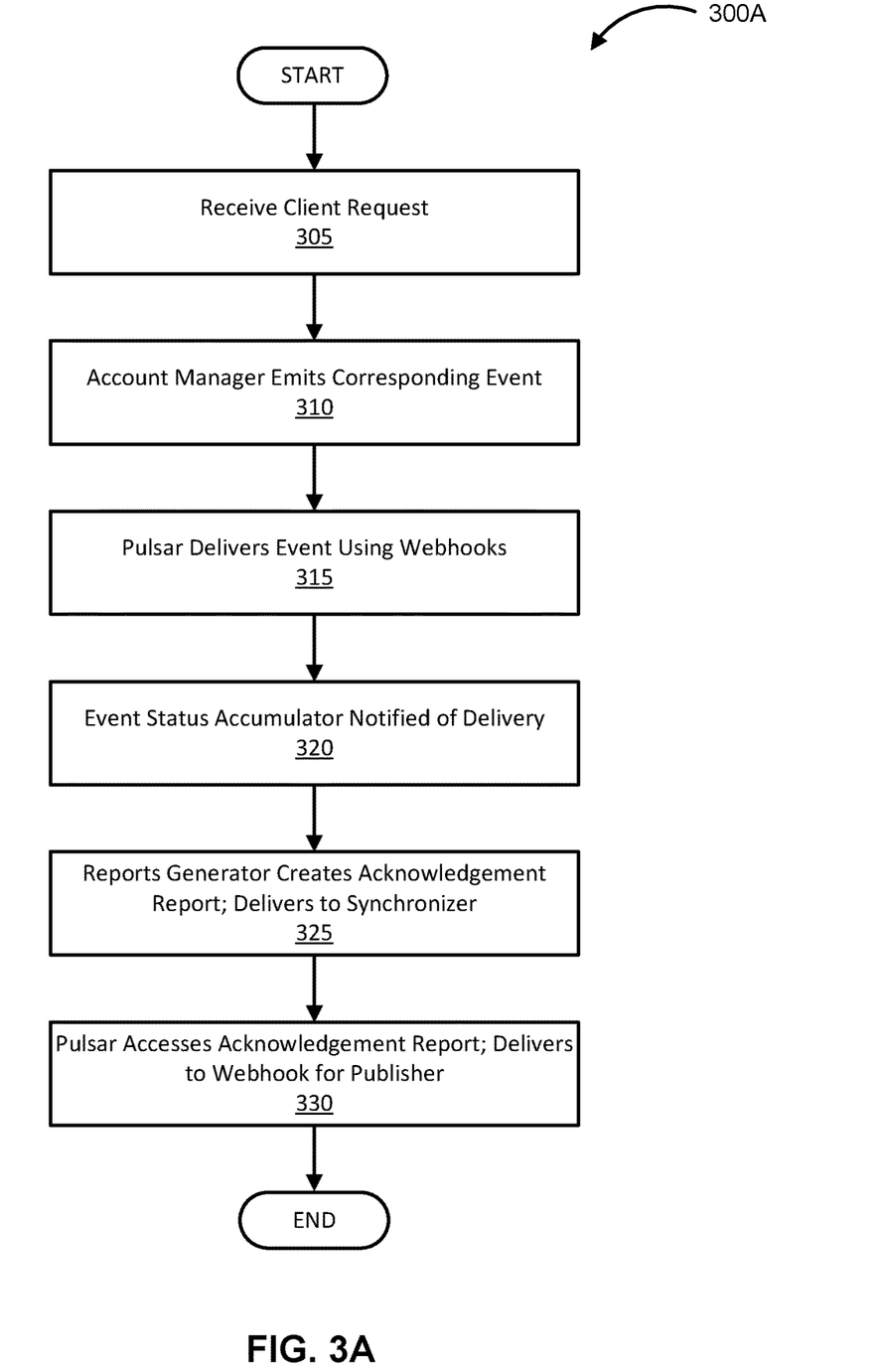
FIG. 3A illustrates a flowchart of a method for generating an acknowledgement report, in accordance with embodiments of the present disclosure.
Figure 3B:
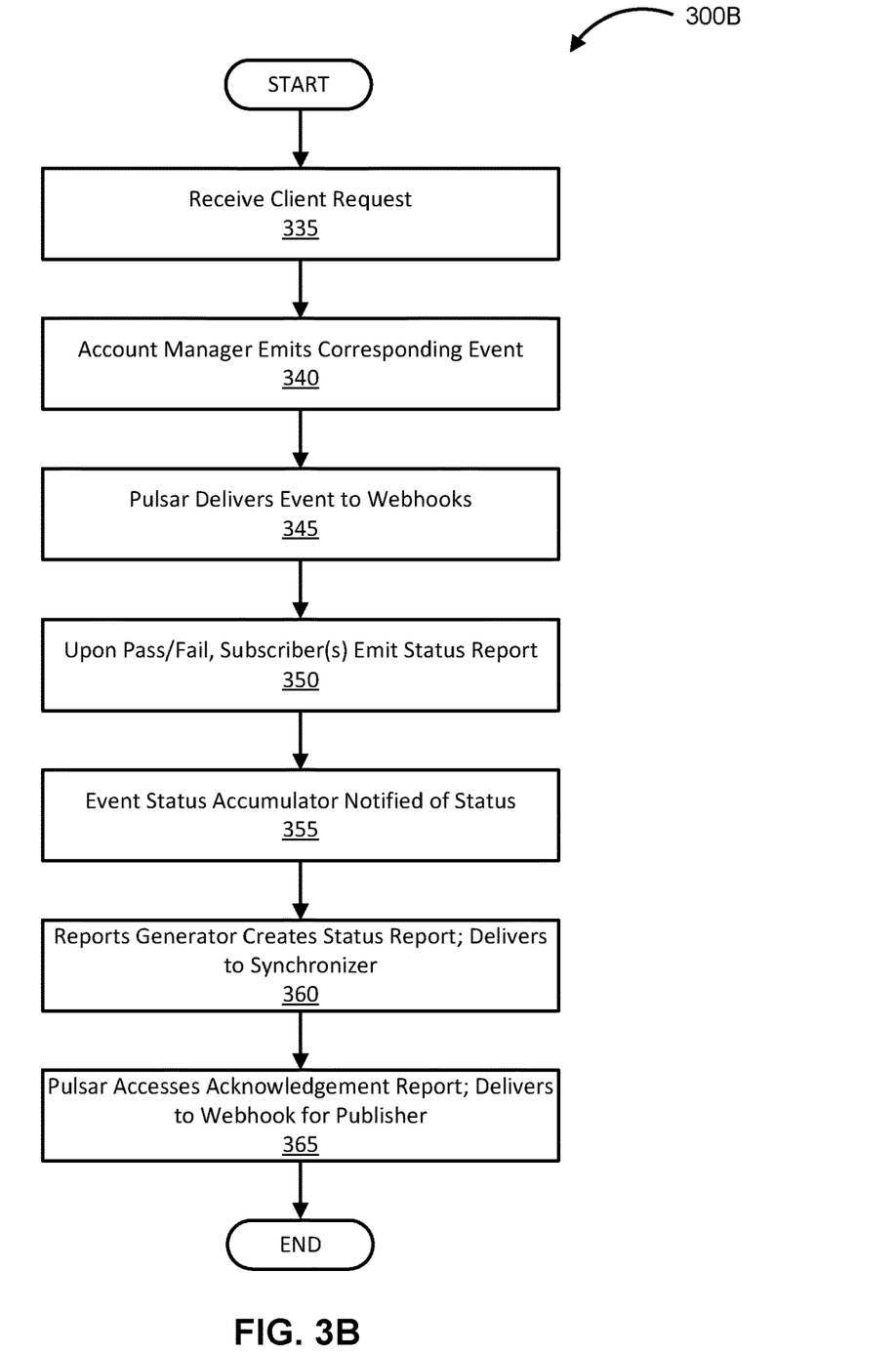
FIG. 3B illustrates a flowchart of a method for generating a change processing status report, in accordance with embodiments of the present disclosure.

The environment/architecture of FIG. 1 and a customer requesting an account cancellation will be used as an example throughout the description of FIGS. 3A-B.

Referring now to FIG. 3A, described is a flowchart for a method 300A for generating an acknowledgement report, in accordance with embodiments of the present disclosure. Method 300A may begin at 305, where a client request is received. In this example, a customer of cloud computing services/provisions may request the cancelation of an account via a client device communicatively coupled to the environment of FIG. 1.

At 310, the account manager may emit a corresponding event. For example, account management 151 may emit an "account.canceled" event to synchronizer 120. Synchronizer 120 may pass the event to the messaging system 150, which may further pass the event to pulsar 170.

At 315, pulsar 170 delivers the event, using webhooks 175, to each subscriber 110. Pulsar 170 may further notify event status accumulator 185 and/or reports generator 195 of the delivery, at 320. In embodiments where multiple subscribers are in play, event status accumulator 185 may receive multiple delivery reports from pulsar 170 and pass them along, asynchronously or concurrently, to reports generator 195.

At 325, the reports generator 195 creates an acknowledgment report detailing, for example, the list of subscribers and whether each subscriber has received the event. Reports generator 195 delivers the report to the synchronizer 120.

In some embodiments, pulsar 170 may, at 330, access the acknowledgment report and deliver it to publisher 105 using webhooks 175.

Referring now to FIG. 3B, illustrated is a flowchart for a method 300B for generating a change processing status report, in accordance with embodiments of the present disclosure. At 335, a client request is received. For example, a client may submit a request to cancel their account.

At 340, account manager 151 may emit an "account.canceled" event to synchronizer 120. Synchronizer 120 may pass the event to the messaging system 150, which may further pass the event to pulsar 170.

At 345, pulsar 170 delivers the event, using webhooks 175, to each subscriber 110. At 350, subscriber 110 processes the change/event, and upon pass/fail, emits an "account.canceled.status" event to synchronizer 120 and/or pulsar 170.

At 355, pulsar 170 notifies event status accumulator 185 of the status. In embodiments where multiple subscribers are in play, event status accumulator 185 may receive multiple status reports from pulsar 170 and pass them along, asynchronously or concurrently, to reports generator 195.

At 360, the reports generator 195 creates a change processing status report detailing, for example, the list of subscribers and whether each subscriber passed/failed when processing the event. Reports generator 195 delivers the status report to the synchronizer 120.

In some embodiments, pulsar 170 may, at 365, access the status report and deliver it to publisher 105 using webhooks 175 (e.g., when publisher 105 requested change processing status reports for the event type in question).

In embodiments, publisher 105 may, in response to receiving a change processing status report indicating one or more subscribers have failed to process the change, generate and emit a rollback event to synchronizer 120. In such instances, synchronizer 120 may distribute the rollback event throughout the extended framework messaging system 115, and provide an acknowledgment report for the rollback event to the publisher 105, once the subscribing microservices have processed the rollback.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
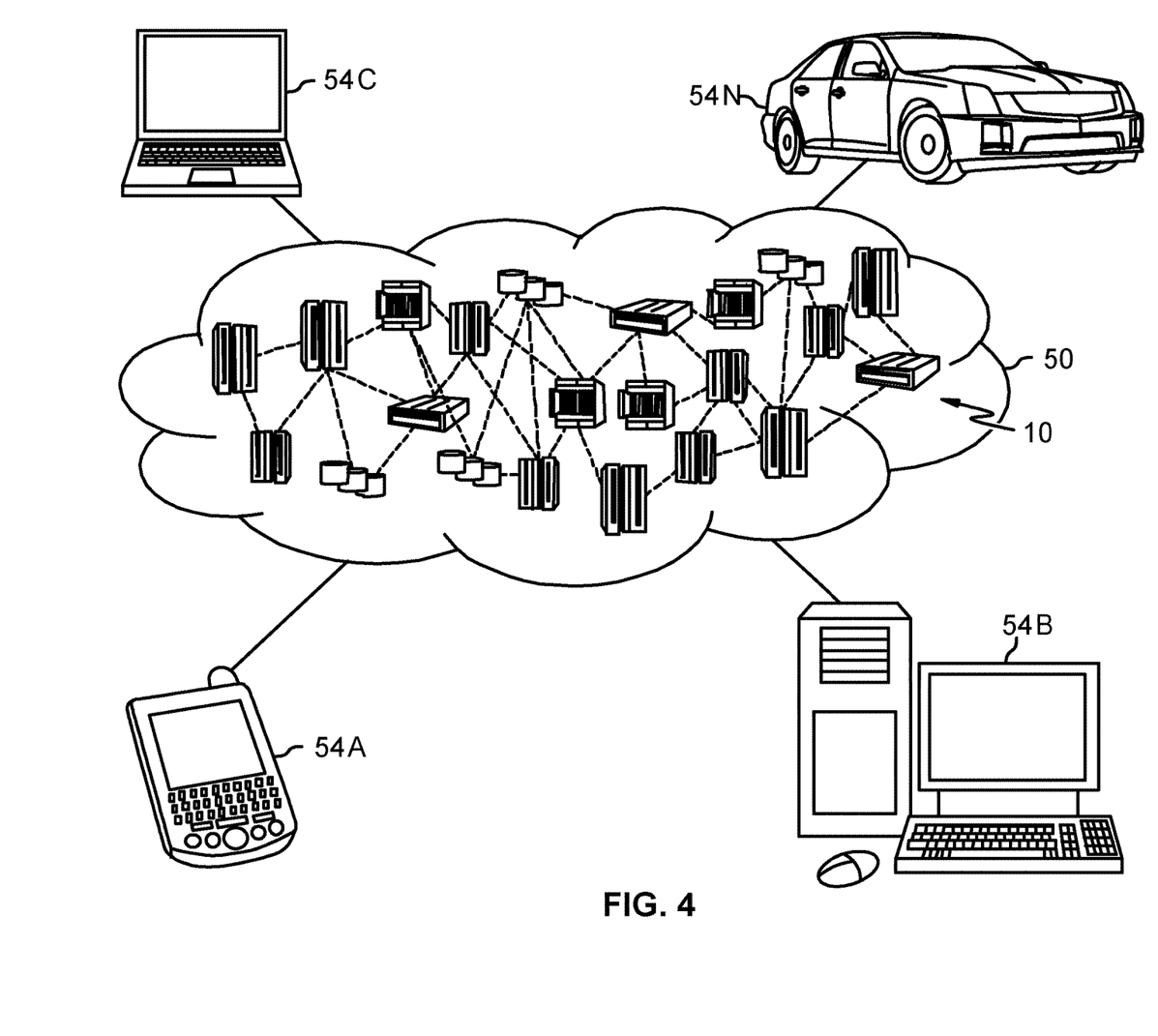
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
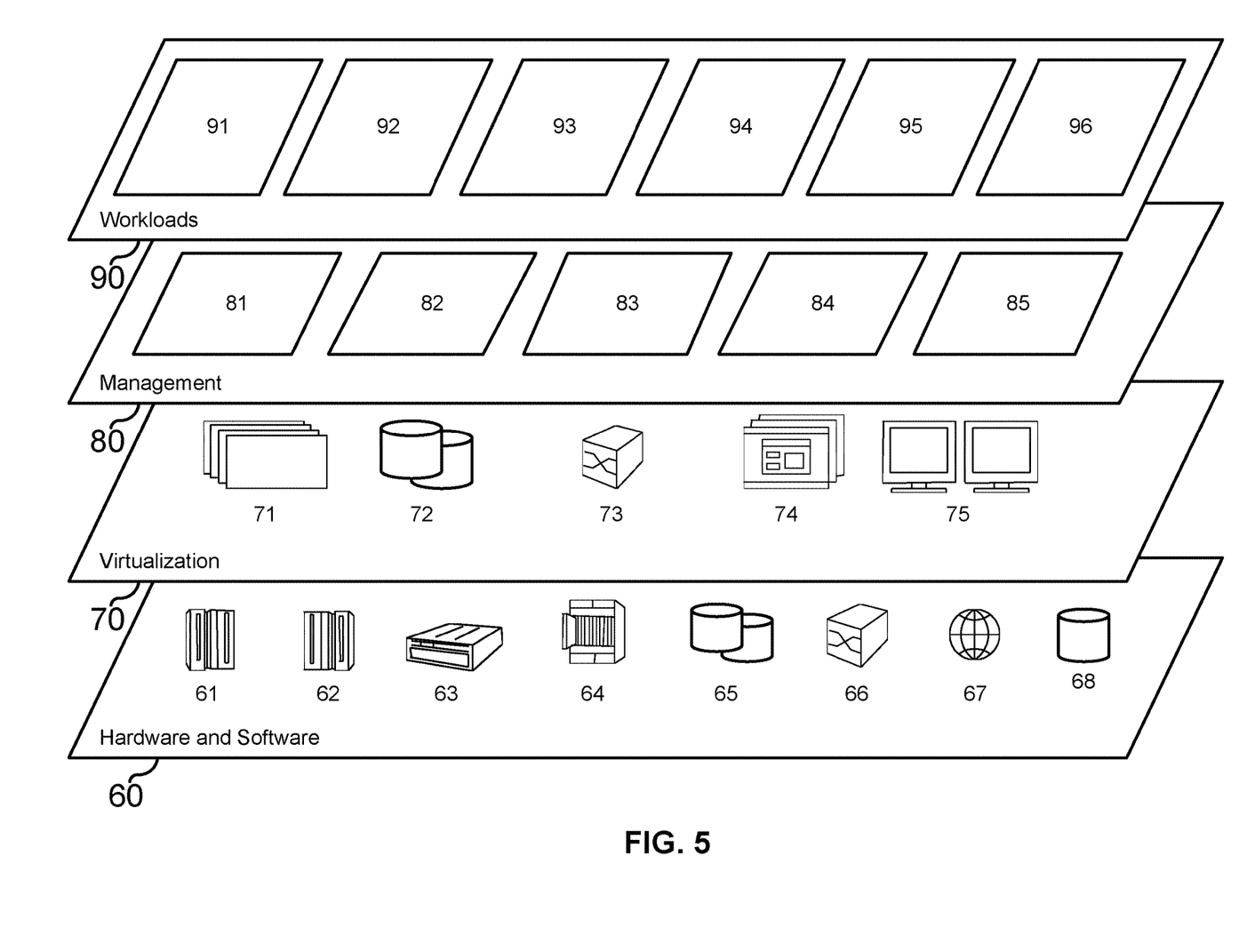
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tracking asynchronous event processing 96.

Figure 6:
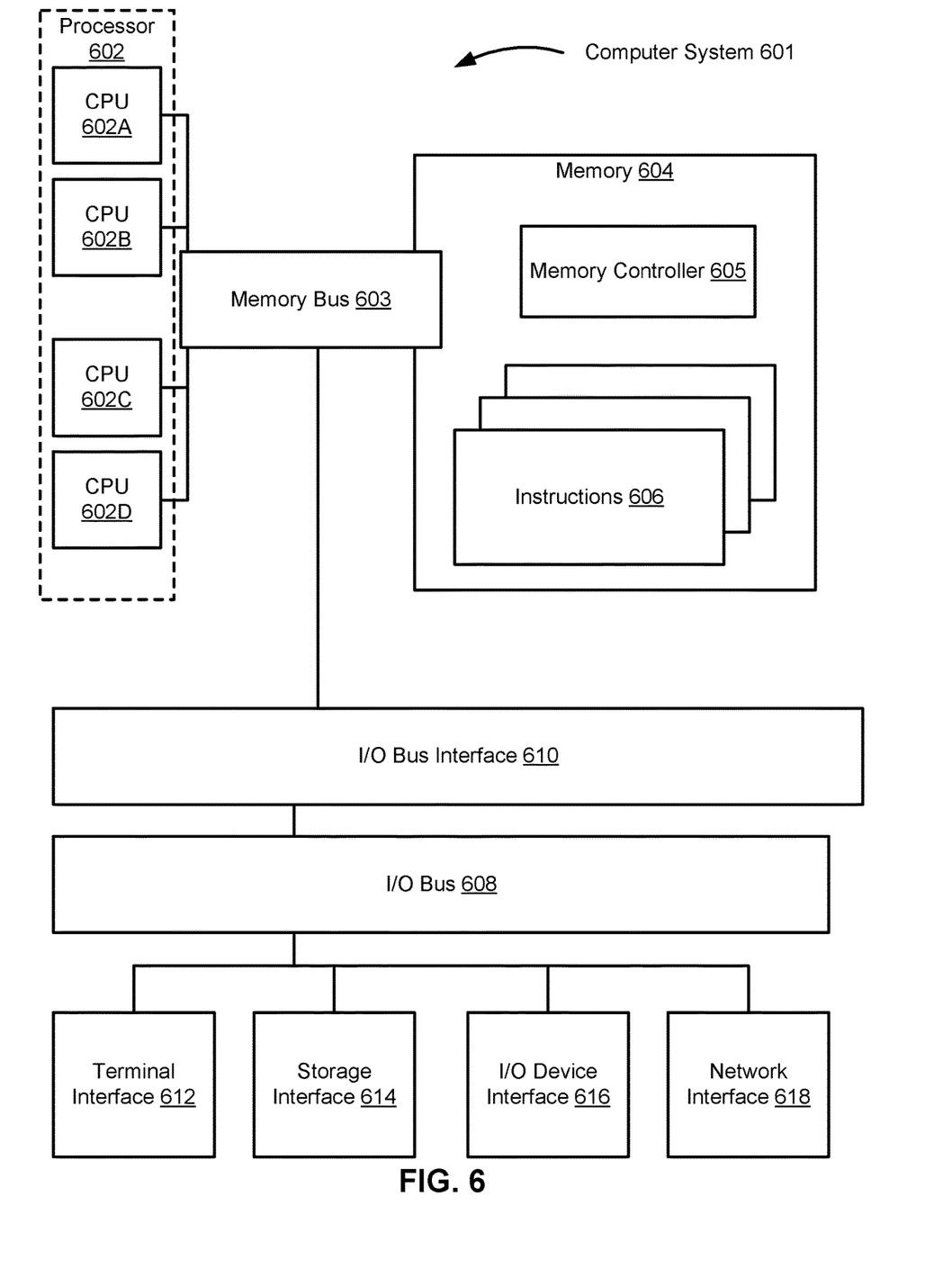
FIG. 6 illustrates a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200/300A/300B, described in FIGS. 2 and 3A-B. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 1-3B.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tracking asynchronous event processing in a microservice architecture using a messaging system to publish events, the method comprising:
   receiving, at the messaging system, a registration from a first microservice for one or more event types to publish, wherein the registration includes an event report policy; and
   monitoring a first event that is described in the event report policy as it is processed by a second microservice.

2. The method of claim 1, wherein the event report policy describes an acknowledgement report, a change processing status report, and a quality of service report, and wherein the quality of service report includes a set of metrics describing latency, throughput, subscriber response time, subscriber processing time, and success rate.

3. The method of claim 1, wherein the event report policy further includes one or more webhook configurations for delivering the event report.

4. The method of claim 1, wherein the event report policy further includes a list of subscriber microservices, and wherein the second microservice is a subscriber microservice.

5. The method of claim 1, wherein the event report policy further includes a timeout configuration for generating a partial change threshold report.

6. The method of claim 1, wherein the first event is received by the messaging system.

7. The method of claim 6, further comprising delivering, to the first microservice, an event report describing the results of the monitoring.

8. The method of claim 7, wherein delivering the event report includes a plurality of event report instances, wherein each event report instance of the plurality of event report instances is associated with a timestamp, the timestamp indicating an event described in the event report policy.

9. A computer program product for tracking asynchronous event processing in a microservice architecture using a messaging system to publish events, the computer program product comprising a computer readable storage medium having program instructions embodied therewith, the program instructions executable by a device to cause the device to:
   receive, at the messaging system, a registration from a first microservice for one or more event types to publish, wherein the registration includes an event report policy; and
   monitor a first event that is described in the event report policy as it is processed by a second microservice.

10. The computer program product of claim 9, wherein the event report policy describes an acknowledgement report, a change processing status report, and a quality of service report.

11. The computer program product of claim 9, wherein the event report policy further includes a list of subscriber microservices, and wherein the second microservice is a subscriber microservice.

12. The computer program product of claim 9, wherein the event report policy further includes a timeout configuration for generating a partial change threshold report.

13. The computer program product of claim 9, wherein the program instructions are further executable by the device to cause the device to deliver, to the first microservice, an event report describing the results of the monitoring.

14. The computer program product of claim 13, wherein the first event is received by the messaging system.

15. A system for tracking asynchronous event processing in a microservice architecture using a messaging system to publish events, comprising:
   a memory with program instructions included thereon; and
   a processor in communication with the memory, wherein the program instructions cause the processor to:
      receive, at the messaging system, a registration from a first microservice for one or more event types to publish, wherein the registration includes an event report policy; and
      monitor a first event that is described in the event report policy as it is processed by a second microservice.

16. The system of claim 15, wherein the event report policy describes an acknowledgement report, a change processing status report, and a quality of service report.

17. The system of claim 15, wherein the event report policy further includes one or more webhook configurations for delivering the event report.

18. The system of claim 15, wherein the event report policy further includes a list of subscriber microservices, and wherein the second microservice is a subscriber microservice.

19. The system of claim 15, wherein the event report policy further includes a timeout configuration for generating a partial change threshold report.

20. The system of claim 15, wherein the program instructions further cause the processor to deliver, to the first microservice, an event report describing the results of the monitoring, and wherein the first event is received by the messaging system.

* * * * *